(12) United States Patent
Dumrongkietiman et al.

(10) Patent No.: US 11,021,061 B2
(45) Date of Patent: Jun. 1, 2021

(54) POWER HYBRID INTEGRATED MANAGEMENT SYSTEM

(71) Applicants: Vinai Dumrongkietiman, Montgomery, WV (US); Yinghua Zhu, Montgomery, WV (US); Norm Mortensen, Montgomery, WV (US)

(72) Inventors: Vinai Dumrongkietiman, Montgomery, WV (US); Yinghua Zhu, Montgomery, WV (US); Norm Mortensen, Montgomery, WV (US)

(73) Assignee: AMT, Inc., Montgomery, WV (US)

( * ) Notice: Subject to any disclaimer, the term of this patent is extended or adjusted under 35 U.S.C. 154(b) by 0 days.

(21) Appl. No.: 14/352,979

(22) PCT Filed: Oct. 18, 2012

(86) PCT No.: PCT/US2012/060866
§ 371 (c)(1),
(2) Date: Apr. 18, 2014

(87) PCT Pub. No.: WO2013/070407
PCT Pub. Date: May 16, 2013

(65) Prior Publication Data
US 2014/0288749 A1    Sep. 25, 2014

Related U.S. Application Data

(60) Provisional application No. 61/548,713, filed on Oct. 18, 2011.

(51) Int. Cl.
*B60L 1/00* (2006.01)
*B60L 9/00* (2019.01)
(Continued)

(52) U.S. Cl.
CPC ............... *B60L 1/00* (2013.01); *B60L 7/12* (2013.01); *B60L 7/18* (2013.01); *B60L 9/00* (2013.01);
(Continued)

(58) Field of Classification Search
CPC ....... B60W 10/08; B60W 20/10; B60L 15/20; B60L 15/2045
(Continued)

(56) References Cited

U.S. PATENT DOCUMENTS 5,318,142 A * 6/1994 Bates ................ B60K 6/28
180/65.245
5,343,970 A * 9/1994 Severinsky ............ B60K 6/387
180/65.25

(Continued)

*Primary Examiner* — Behrang Badii
*Assistant Examiner* — Daniel L Greene
(74) *Attorney, Agent, or Firm* — Johnston Holroyd; Mary-Jacq Holroyd

(57) ABSTRACT

A power interface (14) connected to an ultra capacitor (16), a power source (18), and a load (20), with a controller (22) for managing the power interface (14), and monitoring the ultra capacitor (16), power source (18), and demands of the load (20) attached thereto. The power interface (12) selectively switches the circuit between the ultra capacitor (16) and the power source (18), and between the load (20) in response to the level of demand of the load (20) attached thereto such that the ultra capacitor (16) powers peak demand and the power source (18) powers steady demand.

21 Claims, 6 Drawing Sheets

(51) Int. Cl.

| | | |
|---|---|---|
| *B60L 7/12* | (2006.01) | |
| *B60L 50/52* | (2019.01) | |
| *B60L 53/10* | (2019.01) | |
| *B60L 53/65* | (2019.01) | |
| *B60L 50/40* | (2019.01) | |
| *B60L 50/62* | (2019.01) | |
| *B60L 7/18* | (2006.01) | |
| *B60W 20/10* | (2016.01) | |

(52) U.S. Cl.
CPC .............. *B60L 50/40* (2019.02); *B60L 50/52* (2019.02); *B60L 50/62* (2019.02); *B60L 53/11* (2019.02); *B60L 53/65* (2019.02); *B60W 20/10* (2013.01); *B60L 2200/12* (2013.01); *B60L 2200/26* (2013.01); *B60L 2200/28* (2013.01); *B60L 2200/40* (2013.01); *B60L 2210/30* (2013.01); *B60L 2240/12* (2013.01); *B60L 2240/421* (2013.01); *B60L 2250/26* (2013.01); *B60L 2260/24* (2013.01); *B60L 2260/26* (2013.01); *B60L 2270/44* (2013.01); *Y02T 10/62* (2013.01); *Y02T 10/64* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/167* (2013.01); *Y04S 30/14* (2013.01)

(58) Field of Classification Search
USPC ........................................................ 701/22
See application file for complete search history.

(56) References Cited

U.S. PATENT DOCUMENTS

| | | | | |
|---|---|---|---|---|
| 5,887,674 | A * | 3/1999 | Gray, Jr. ................. | B60K 5/08 180/307 |
| 6,209,672 | B1 * | 4/2001 | Severinsky ............ | B60K 6/442 180/65.23 |
| 6,321,145 | B1 * | 11/2001 | Rajashekara .......... | B60L 58/30 701/22 |
| 6,338,391 | B1 * | 1/2002 | Severinsky ............ | B60K 6/442 180/65.23 |
| 6,876,098 | B1 | 4/2005 | Gray, Jr. | |
| 7,456,509 | B2 | 11/2008 | Gray, Jr. | |
| 7,533,745 | B2 | 5/2009 | Laeuffer | |
| 7,831,343 | B2 | 11/2010 | Formanski | |
| 2001/0039230 | A1 * | 11/2001 | Severinsky ............ | B60L 58/12 477/3 |
| 2002/0080523 | A1 | 6/2002 | Gochou et al. | |
| 2002/0174796 | A1 * | 11/2002 | Kumar ..................... | B60L 7/12 105/26.05 |
| 2002/0174797 | A1 * | 11/2002 | Kumar ..................... | B60L 7/22 105/26.05 |
| 2002/0174798 | A1 * | 11/2002 | Kumar ..................... | B60L 7/12 105/50 |
| 2002/0177929 | A1 * | 11/2002 | Kumar ..................... | B60L 7/12 701/19 |
| 2003/0150352 | A1 * | 8/2003 | Kumar ..................... | B60L 7/12 105/35 |
| 2003/0214267 | A1 * | 11/2003 | Long ..................... | H02J 7/0016 320/116 |
| 2003/0233959 | A1 * | 12/2003 | Kumar ..................... | B60L 7/06 105/26.05 |
| 2004/0135436 | A1 * | 7/2004 | Gilbreth ................... | H02J 1/14 307/18 |
| 2005/0005814 | A1 * | 1/2005 | Kumar ..................... | B60K 6/28 105/35 |
| 2005/0040789 | A1 * | 2/2005 | Salasoo et al. ............... | 320/119 |
| 2005/0080523 | A1 | 4/2005 | Bennett | |
| 2005/0139399 | A1 * | 6/2005 | Gopal ................. | B60L 11/1887 180/65.1 |
| 2006/0005736 | A1 * | 1/2006 | Kumar ......................... | 105/1.4 |
| 2006/0005738 | A1 * | 1/2006 | Kumar ......................... | 105/35 |
| 2006/0005739 | A1 * | 1/2006 | Kumar ......................... | 105/35 |
| 2006/0012320 | A1 * | 1/2006 | Kumar ..................... | B60L 7/06 318/376 |
| 2007/0000247 | A1 * | 1/2007 | Perkins ..................... | B60T 1/10 60/565 |
| 2008/0021602 | A1 | 1/2008 | Kingham | |
| 2008/0211230 | A1 * | 9/2008 | Gurin ..................... | B60K 6/28 290/2 |
| 2009/0125170 | A1 * | 5/2009 | Noffsinger ................ | B60L 7/16 701/20 |
| 2010/0065357 | A1 | 3/2010 | Oyama | |
| 2010/0116574 | A1 | 5/2010 | Gilmore | |
| 2010/0136379 | A1 * | 6/2010 | King ................. | H01M 8/04619 429/432 |
| 2010/0145562 | A1 | 6/2010 | Moran | |
| 2010/0292877 | A1 * | 11/2010 | Lee ........................... | B60K 1/04 701/21 |
| 2011/0073392 | A1 * | 3/2011 | Collins et al. ............. | 180/65.22 |
| 2011/0083919 | A1 * | 4/2011 | Kshatriya ............ | B60W 20/15 180/65.26 |
| 2011/0094808 | A1 | 4/2011 | Mazumdar | |
| 2011/0094841 | A1 | 4/2011 | Mazumdar | |

* cited by examiner

POWER HYBRID INTEGRATED MANAGEMENT SYSTEM

RELATED APPLICATIONS

This application claims the benefit of U.S. Provisional Application Ser. No. 61/548,713 entitled "POWER HYBRID INTEGRATED MANAGEMENT SYSTEM" filed on 18 Oct. 2011, the contents of which are incorporated herein by reference in its entirety.

BACKGROUND OF THE INVENTION

CSX Trains can move a ton of freight over 400 miles per a gallon of diesel, which is a fuel efficiency of 400 mpg/ton. Calculated from fuel consumption, amount of freight and distance for over a year. A modern diesel-electric locomotive diesel engine drives an electrical generator whose output provides power to the traction motors. There is no mechanical connection between the engine and the wheels. Trains are also designed to capture energy from breaking action.

The conventional art of powering vehicle engines and consumer motors, for automobiles, truck-trailers, generators, and the like, using combustion engines which require the motor to run when idle. There are few engines for consumer motors that cut the engine off while idling to dramatically reduce the loss of energy when not needed. These devices have some limitations and are not widely available.

U.S. Pat. Nos. 6,876,098 and 7,456,509 teach methods of operating a series of hybrid vehicles in a manner that responds to the operator's demand for power output, while maximizing engine efficiency and minimizing disruptions in vehicle drivability, which includes embodiments in which the engine is selectively turned off when not needed. US Patent Application No. 2010/0116574 teaches a cost effective configuration for supercapacitors for HEV in which the supercapacitors are disposed in parallel. U.S. Pat. No. 7,831,343 teaches an efficiency optimized hybrid operation strategy that includes the algorithm utilized to incorporate regenerative breaking, optimum fuel cell, or electric energy storage systems, which include supercapacitors as an energy source.

US Patent Application Pub. No. 2010/0065357 teaches a vehicle and control method of vehicle which tries to balance the charge discharge power demand for a vehicle. U.S. Pat. No. 7,533,745 teaches a power transmission method and device for a motor vehicle comprising a heat engine and at least one electric machine, which includes a super capacitor to store unused energy from the heat engine, which is then used for power. US Patent Application Pub. No. 2002/0080523 describes silent operating mode for reducing emissions of a hybrid electric vehicle.

Similar technologies exist in analogous art. US Patent Application Pub. No. 2010/0145562 shows a method of controlling engine stop-start operation for heavy-duty hybrid-electric vehicles in which fuel and/or combustion is reduced when not needed or when desired. US Patent Application Pub. No. 2008/0021602 teaches an electrically powered rail propulsion vehicle and method. US Patent Application No. 2011/0094808 shows a peak demand reduction in mining haul trucks utilizing an on-board energy storage system. US Patent Application Pub. No. 2011/0094841 shows a system and method for reinjection of retard energy in a trolley-based electric mining haul truck. US Patent Application Pub. No. 2005/0080523 shows a silent operating mode for reducing emissions of a hybrid electric vehicle.

SUMMARY OF THE INVENTION

The present invention uses power hybrid integrated management systems (PHIMS) with PHIMS Power Interface to bring fuel efficiency to automobiles, all terrain vehicles (ATV), motorcycles, trucks-trailers, and generator applications to provide equivalent or superior fuel efficiency. The present design applies similar principles of the hybrid diesel-electric locomotive to the automobile and other consumer combustion engine technologies with an added computer controller PHIMS.

The PHIMS (12) has a power interface (14) connected to an ultra capacitor (16), a power source (18), and a load (20), with a controller (22) for managing the power interface (14), and monitoring the ultra capacitor (16), power source (18), and demands of the load (20) attached thereto. The power interface (14) selectively switches the circuit between the ultra capacitor (16) at S1 and the power source (18) at S2, and between the load (20) at S3 and S4 in response to the level of demand of the load (20) attached thereto such that the ultra capacitor (16) powers peak demand and the power source (18) powers steady demand.

The PHIMS (12) power interface (14) with fast charge and discharge energy storage may use ultra capacitors (16), also known as supercapacitors, to provide the same fuel efficiency as diesel-electric locomotive of 400 mpg/ton to consumer applications. For example, an automobile with a total weight of 1 ton, 2000 lbs. has a fuel mileage of 400 mpg or better. A further benefit is that smaller engines may be used, and need less automatic or manual transmission.

This principle can be applied to the way we use electricity. By using small natural gas combustion engine with 4 KW generator, the average home needs 2-3 KWH, combined with a computer controller PHIMS, PHIMS Power Interface and fast charge energy storage, such as ultracapacitor or mechanical potential energy storage, according to various embodiments of the present design. A natural gas generator, according to alternative embodiments of the present design, produces electricity for the home, or on a site unattached to power lines/transmission systems.

A further aspect of the power hybrid integrated management system according to alternative embodiments of the present design does not waste as much energy as drawing from power lines and transmission systems.

PHIMS will only operate to start/stop a generator on demand, or to reconnect to commercial power and store excess energy into fast temporary storage devices, such as ultra-capacitor or mechanical potential energy storage. The heat from the generator's engine can be captured to reuse in heating water or home.

The current ways we use electricity produced by combustion engines create from 70% to 90% waste. By integrating PHIMS and PHIMS Power Interface into local energy production, energy can be provided on demand to regenerate, store, and generate heat for the home or other well known uses.

Conventional combustion engine in automobiles need or require some minimum revolution to build up enough torque initially to move the vehicle, especially under zero to sixty miles per hour in a few seconds such as 45 to 60 seconds. Bigger sized engines will give better performance with less time to achieve the required speed of 0 to 60 MPH in 45 to 60 seconds; however, the power wasted is extreme. With the present design, to accelerate to 60 MPH, extra power is delivered from the ultra capacitor (16) as fast energy storage for a few seconds. For a one ton car, a twenty horsepower engine could be used to cruise at 60 or 70 MPH, by assigning double power up to 40 HP, it will have over excess power for fast charging back to the ultra capacitor (16). when the vehicle moves from stationary or accelerates, the ultra capacitor (16) may provide power to the motor (24). The engine (28) then switches the power generator to excess power to charge the ultra capacitor (16). The engine (28) may be turned off entirely during deceleration, stopping, or standing to save fuel. Furthermore, when the brakes are applied in a vehicle according to the present design, the engine may be turned off and the regenerative power of braking can be charged back to the ultra capacitor by the PHIMS (12).

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

Similar reference characters denote corresponding features consistently throughout the attached drawings.

DETAILED DESCRIPTION OF PREFERRED EMBODIMENTS

Figure 1:
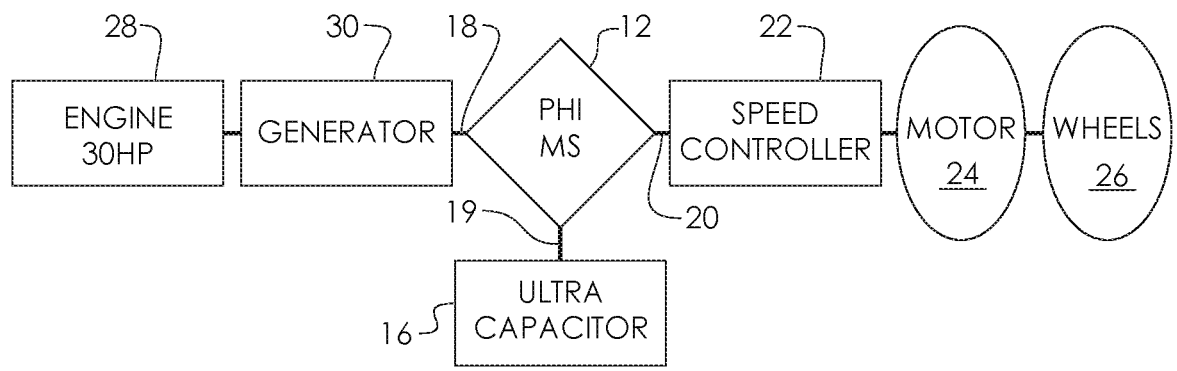
FIG. 1 shows an object diagram according to an embodiment of the present design showing a generic arrangement for any type of device which uses an engine (28) and a motor (24) to rotate an axle (26), including all types of automobiles, industrial machinery, and mining vehicles, incorporating the power hybrid integrated management system (12).
Figure 2:
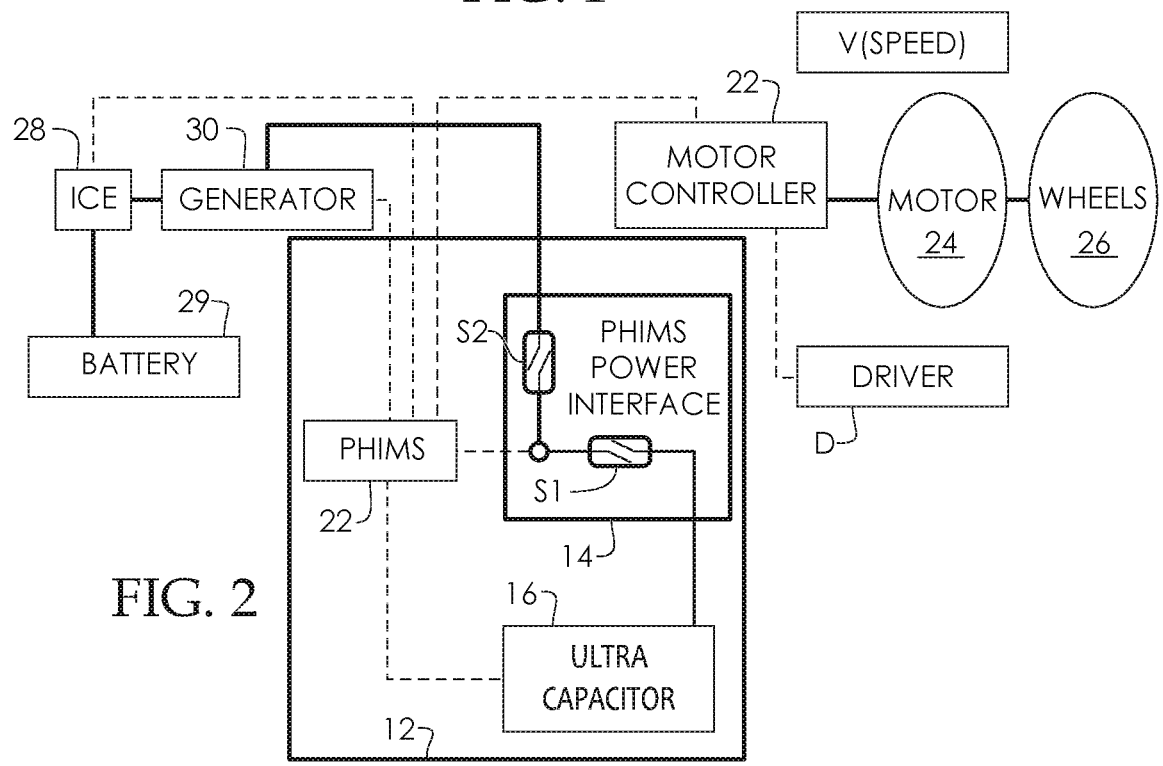
FIG. 2 shows an object diagram according to an embodiment of the present design showing an arrangement for an automobile having an internal combustion engine (28) with a generator (30) and battery (29) and a motor controller (22).

PHIMS controller (22) and PHIMS Power Interface (14) with at least one ultra capacitor (16) together form the PHIMS (12), as shown in FIGS. 1 and 2. PHIMS controller (22) will turn the power source (18), such as an internal combustion engine (ICE) (28) off when no demand for power to the load (20), such as a motor (24) is present. The PHIMS controller (22) then restarts the engine (28) through the starter battery (29) when power is needed or optionally when a depleted ultra capacitor (16) needs to be recharged. The depleted ultra capacitor (16) may alternatively be charged when the engine (28) is turned on. While the engine (28) is turned off, all the accessories and equipment are run from the ultra capacitor (16) or other storage device such as a battery (34).

The present invention describes ultra capacitors (16) in the singular; however, a plurality of ultra capacitors (16) may replace a single ultra capacitor (16) or any number as required. Furthermore, power sources (18), loads (20), and batteries may be described in the singular but may be replaced or added to by duplicate devices. For example, a battery may be replaced by a plurality of batteries. The same is true with motors (24), axles (26), controllers, generators (30), limiter converters (32), AC/DC converters (35), and the like.

FIG. 1 shows an object diagram according to an embodiment of the present design showing a generic arrangement for any type of device which uses an engine (28) and a motor (24) to rotate an axle (26), including all types of automobiles, industrial machinery, and mining vehicles, incorporating the power hybrid integrated management system (12). The power hybrid integrated management system (12), alternatively referred to herein as PHIMS (12), provides an active control of power demand and power resources for a power source (18). In the example of FIG. 1, the speed of rotation of a motor (24) driven axle (26) is actively monitored by the PHIMS (12) controller (22) which switches a power interface (14) between S1 and S2, shown in FIG. 2, to selectively provide power to the motor (24) by either the ultra capacitor (16) at line (19) or a primary power source (18). Multiple ultra capacitors and power sources may be used; however, for simplicity sake the present design is only explained in terms of a single ultra capacitor, and in FIGS. 1 and 2, the single power source (18) is described as an internal combustion engine (28) with a generator (30). A battery (29) may also be used to start the internal combustion engine (28).

FIG. 2 shows a more detailed object diagram according to an embodiment of the present design showing an arrangement for an automobile having an internal combustion engine (28) with a generator (30) and battery (29) and a motor controller (22) to determine the power demand by the driver (D). The PHIMS controller (22) monitors the motor controller (22) for acceleration demand of the driver (D) and switches the PHIMS power interface (14) at S1 and S2 to allow the ultra capacitor(s) (16) to provide responsive acceleration to power the motor (24) for the duration of the demand for increased speed of rotation in the axel (26) or until the ultra capacitor (16) is discharged. The PHIMS (22) monitors the ultra capacitor (16) and the internal combustion engine (28) as well as the motor controller (22), and switches at S1 off and S2 on to the internal combustion engine (28) for coasting speeds (constant power drain) or when the ultra capacitor(s) (16) is discharged. In FIG. 2, the dashed lines represent the monitoring signals of the PHIMS controller (22) and the solid lines represent power connections. The heavy lines represent the PHIMS apparatus (12) which may be contained within a single chamber (not shown). When the device is coasting, or does not have an active power demand, the engine, generator, battery or other power source is turned off. The ultra capacitors (16) handles at least initially any power demand by the load until the power source is turned back on, or switched to at S2, as appropriate, e.g., when a fully electric vehicle is used, and the power supply is a battery. Although the load (20) is generically used to designate energy loss, and the power source (18) is depicted as the energy source.

The PHIMS (12) has a power interface (14) connected to an ultra capacitor (16), a power source (18), and a load (20), with a controller (22) for managing the power interface (14), and monitoring the ultra capacitor (16), power source (18), and demands of the load (20) attached thereto. The power interface (12) selectively switches the circuit between the ultra capacitor (16) at S1 and the power source (18) at S2, and between the load (20) at S3, shown in FIG. 7, in response to the level of demand of the load (20) attached thereto such that the ultra capacitor (16) powers peak demand and the power source (18) powers steady demand.

Figure 3:
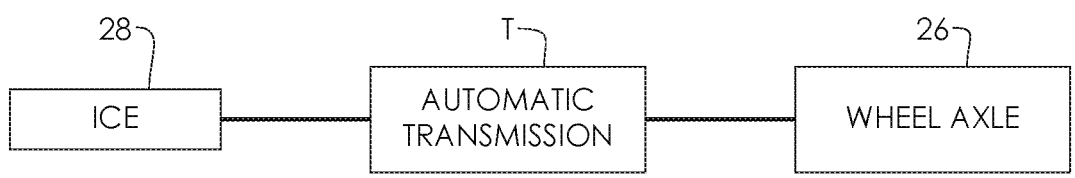
FIG. 3 shows an object diagram depicting a conventional prior art internal combustion engine (28) for a vehicle with an automatic transmission (T), a motor (24) to rotate an axle (26).
Figure 4A:
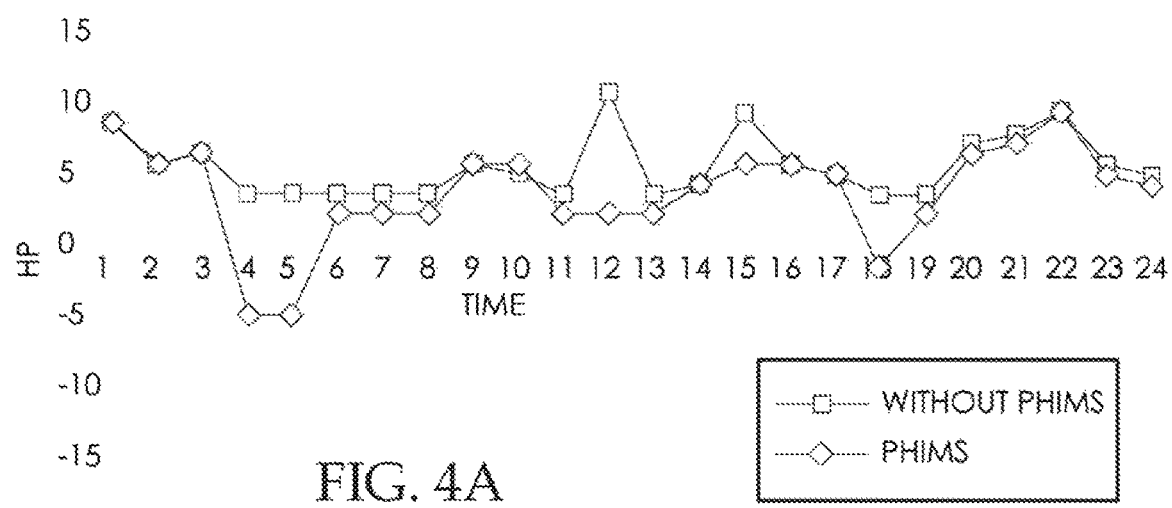
FIG. 4A shows a graph depicting calculated fuel usage in horsepower (HP) versus time, and comparing conventional diesel engine vehicles (without PHIMS), according to FIG. 3, to the same size/weight vehicle utilizing the present design (with PHIMS), according to FIG. 2.
Figure 4B:
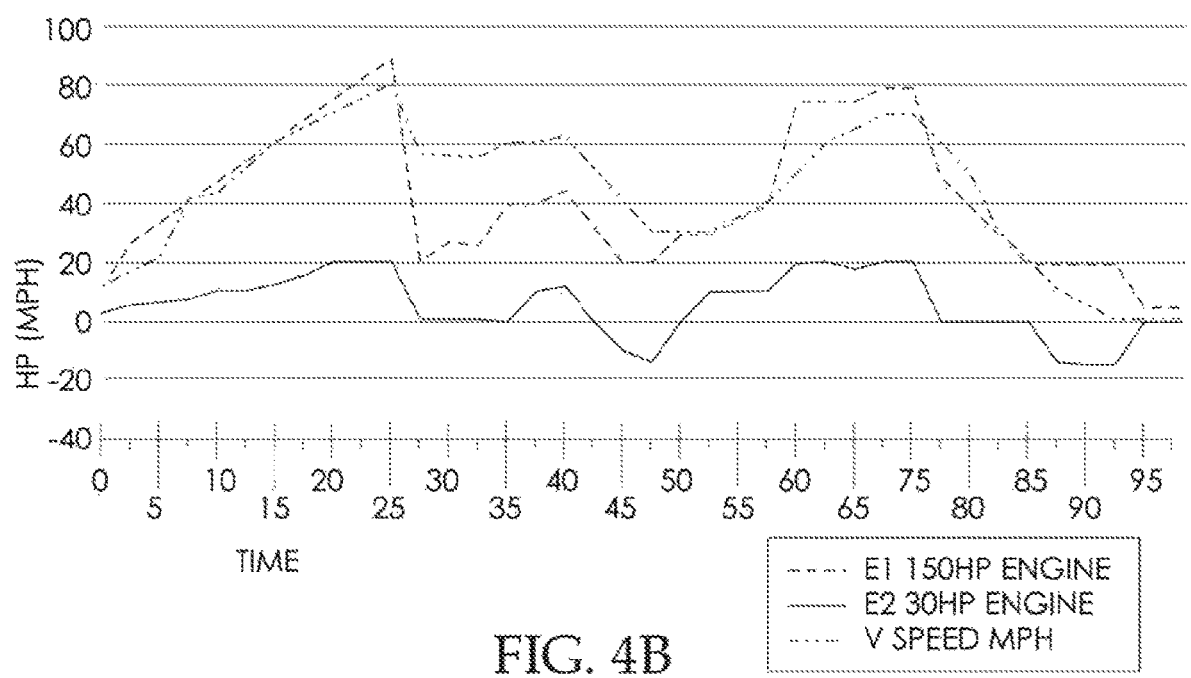
FIG. 4B shows a graph depicting estimated normal driving conditions comparing the speed in MPH with the power required to match that speed in a 150 horsepower engine without PHIMS (prior art) and a 30 horsepower engine with PHIMS according to the present design.
Figure 4C:
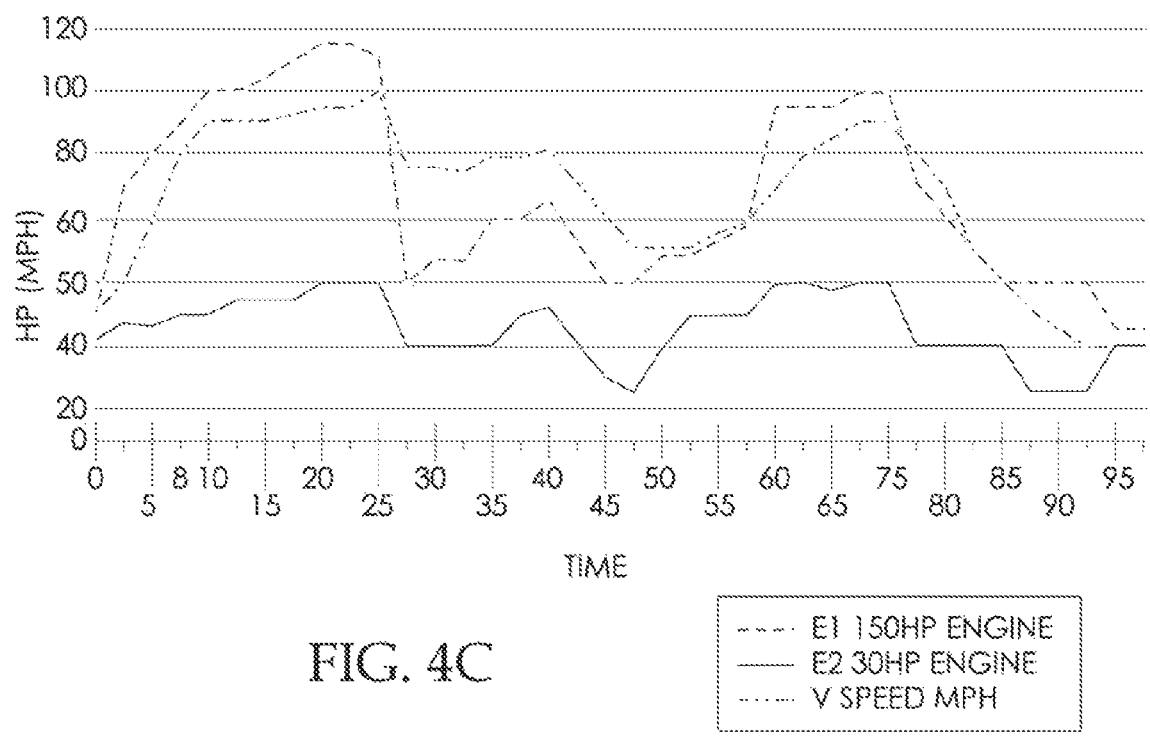
FIG. 4C shows a chart depicting estimated fast acceleration conditions comparing the speed in MPH with the power required to match that speed in a 150 horsepower engine without PHIMS (prior art) and a 30 horsepower engine with PHIMS according to the present design.

FIG. 3 shows an object diagram depicting a conventional prior art internal combustion engine (28) for a vehicle with an automatic transmission (T), a motor (24) to rotate an axle (26). When more power is needed, the output of the internal combustion engine (28) increases. FIGS. 4A though 4C depict anticipated comparisons between the power efficiencies of vehicles with and without a PHIMS. FIG. 4A shows a graph depicting calculated fuel usage in horsepower (HP) versus time, and comparing conventional diesel engine vehicles (without PHIMS), according to FIG. 3, to the same size/weight vehicle utilizing the present design (with PHIMS), according to FIG. 2. The FIGS. 4B and 4C depict the differences between conventional 150 HP engine without PHIMS and a 30 HP engine with PHIMS. The anticipated results show that the amount of power required by the 30 HP engine with PHIMS would be significantly lower than the amount anticipated for the conventional 150 HP engine.

With reference to the graph depicted in FIG. 4A, the anticipated impact on energy consumption can be demonstrated. While the brake is activated, the motor regenerates power back to the ultra capacitor as the car slows down. When the vehicle needs to accelerate, the ultra capacitor acts as a power booster for the motor. In alternative designs, the diesel engine size can be reduced by more than ⅓ size of a standard diesel engine while still maintaining the same performance. See Table 1. Similar results may be obtained with any combustion engine, as shown in FIGS. 4B and 4C. The size of a combustion engine may be reduced by ⅓ to ⅕ horse power and still provide a significant burst of energy during acceleration from ultra capacitor/energy storage device by PHIMS controller and PHIMS Power Interface. See Tables 3 and 4.

The energy stored in diesel fuel in the form produced by combustion in an engine per one (1) gallon is equal to 40.65 kw-hr.

Energy conversion one (1) kw/s = 737.27 ft-lb/s or 0.140 mile-lb/s

Potential Energy of diesel (P) = 40.65 kw-hr per gallon (kw-hr/g)

= 737.27 * 40.65 * .0.140

P = 20433.46 mile-lb.

Car Coefficient of Rolling Friction (CRF) = 0.01

Force to move one (1) ton (F) = 2000 lb. * 0.01 = F = 20 lbs.

Diesel engine efficiency = 46%

Wheel conversion efficiency = 80%

Total efficiency e = 46% * 80% = 36.8% = 0.368

P = F * D (distance)

D = P * e / F = (20433.46 * 0.368) / 20

The energy in one (1) gallon of diesel fuel will therefore be able to move one (1) ton of weight of a car at 376 mpg/ton. According to fuel efficiency report from CSX in 2007, their trains achieved 253 billion ton of freight and consumed 569 million gallons of diesel (#2) fuel. The CSX train system efficiency is 253E9/569E6, which has an average fuel efficiency of 445 mpg per ton of freight. Also, see table 1.

One (1) gallon of diesel is able to move a one (1) ton car over 376 miles where CRF is equal to 0.01 (CRF for Locomotive Rail 0.001 to 0.006). The reason for diesel-electric locomotives have great fuel mileage because slow take off, and average 25 to 40 mph, less stop due traffic. Automobile runs on the road or highway, constantly required to slow down, stop, start, accelerate much more frequently than railroad locomotive system.

In order to make trucks with fuel mileage same as or better than a diesel-electric locomotive we have to consider the differences between a conventional internal combustion engine design and a diesel electric truck with a PHIMS according to the present design. By cutting the engine in the automobile off, the fuel savings can be raised dramatically. An internal combustion engine with a 150 HP engine which is always on uses one hundred percent of the power of the engine during idle, and also uses all of the 150 HP, and to travel at 75 MPH, a 2000 pound card needs the entire 150 HP, and the power to the wheel results in a transmission loss of six percent.

Figure 5:
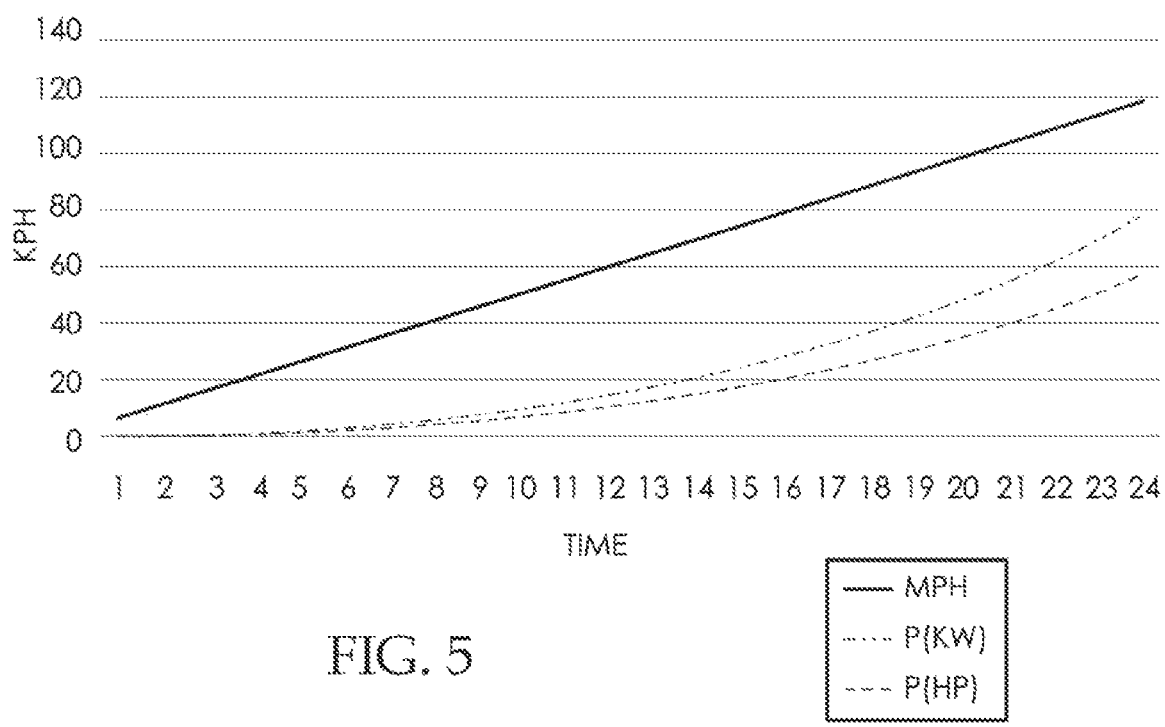
FIG. 5 shows a graph depicting power requirements in time versus speed according to the calculations of the present design.

FIG. 5 represents the advantages of the present design relative to the power required (MPH). A diesel-electric automobile may have a diesel-electric engine, with a computer controller (PHIMS controller) for start and stop requirements, slowing down, and acceleration, and to regenerate braking power. The ultra-capacitor is available for fast charge-discharge for temporary energy storage. The resultant engine size for the same mileage or power usage could be twelve percent. Only six to ten horsepower would be required for a 2000 pound vehicle traveling at 75 MPH, with the actual horsepower required for the engine being from 6/0.550=10~10/0.055=18 HP. The power to the axle under such conditions would have an electric motor that has 95 percent efficiency. See Table 2.

Figure 6:
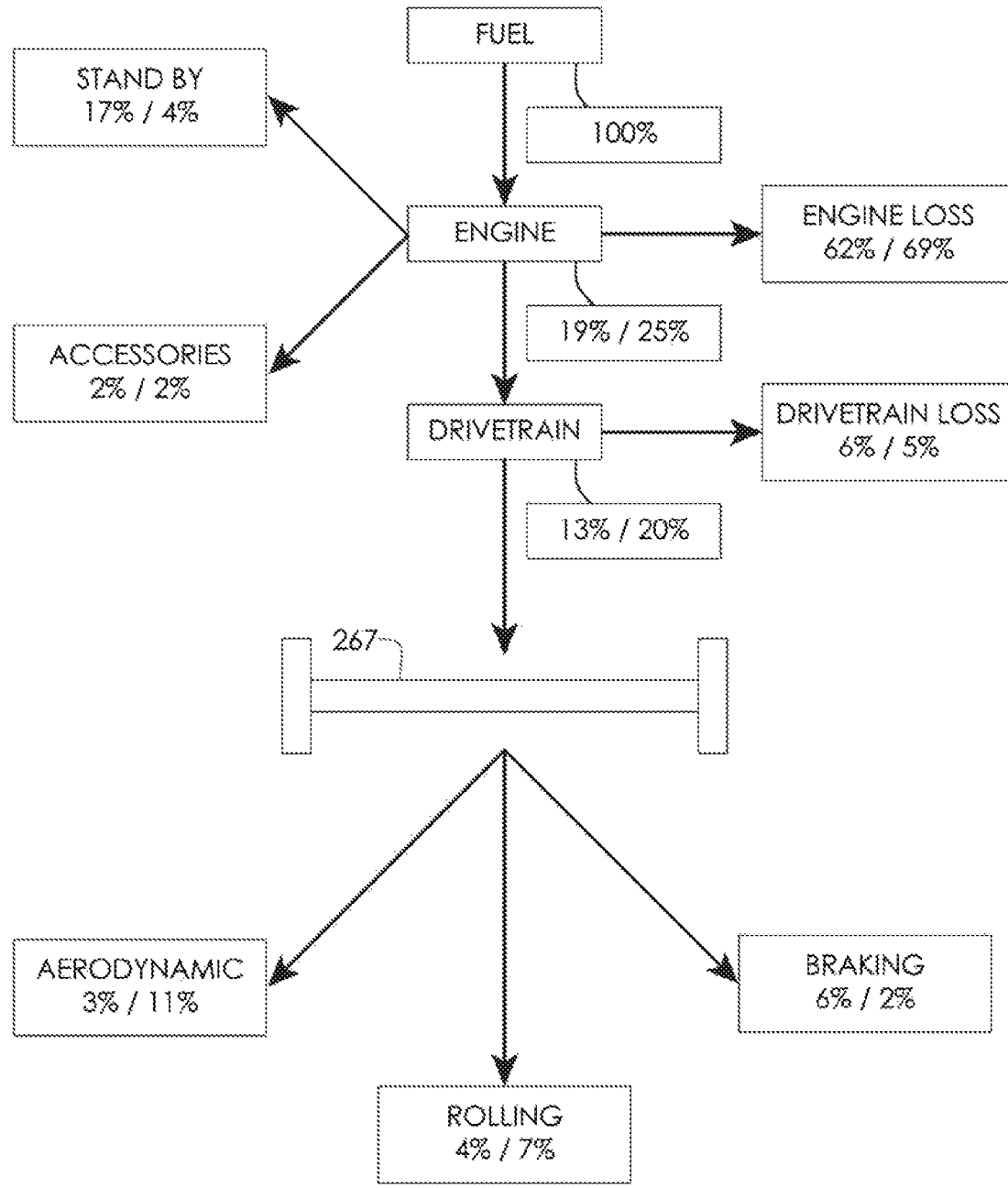
FIG. 6 is an object diagram showing urban/highway driving conditions and conventional energy loss for prior art automobiles; the first percentage indicating the calculated urban energy usage and the second percentage indicating the calculated highway energy usage.

FIG. 6 is an object diagram showing urban/highway driving conditions and conventional energy loss for prior art automobiles; the first percentage indicating the calculated urban energy usage and the second percentage indicating the calculated highway energy usage. As can be seen from the figures, the conventional automobile has a lot of energy loss during standby, idling, constant velocity, and only requires energy during acceleration. From sixty-two to sixty-nine percent of the engine power produced by conventional internal combustion engines is simply loss which represents the majority of the power generated by the conventional engine.

Figure 7:
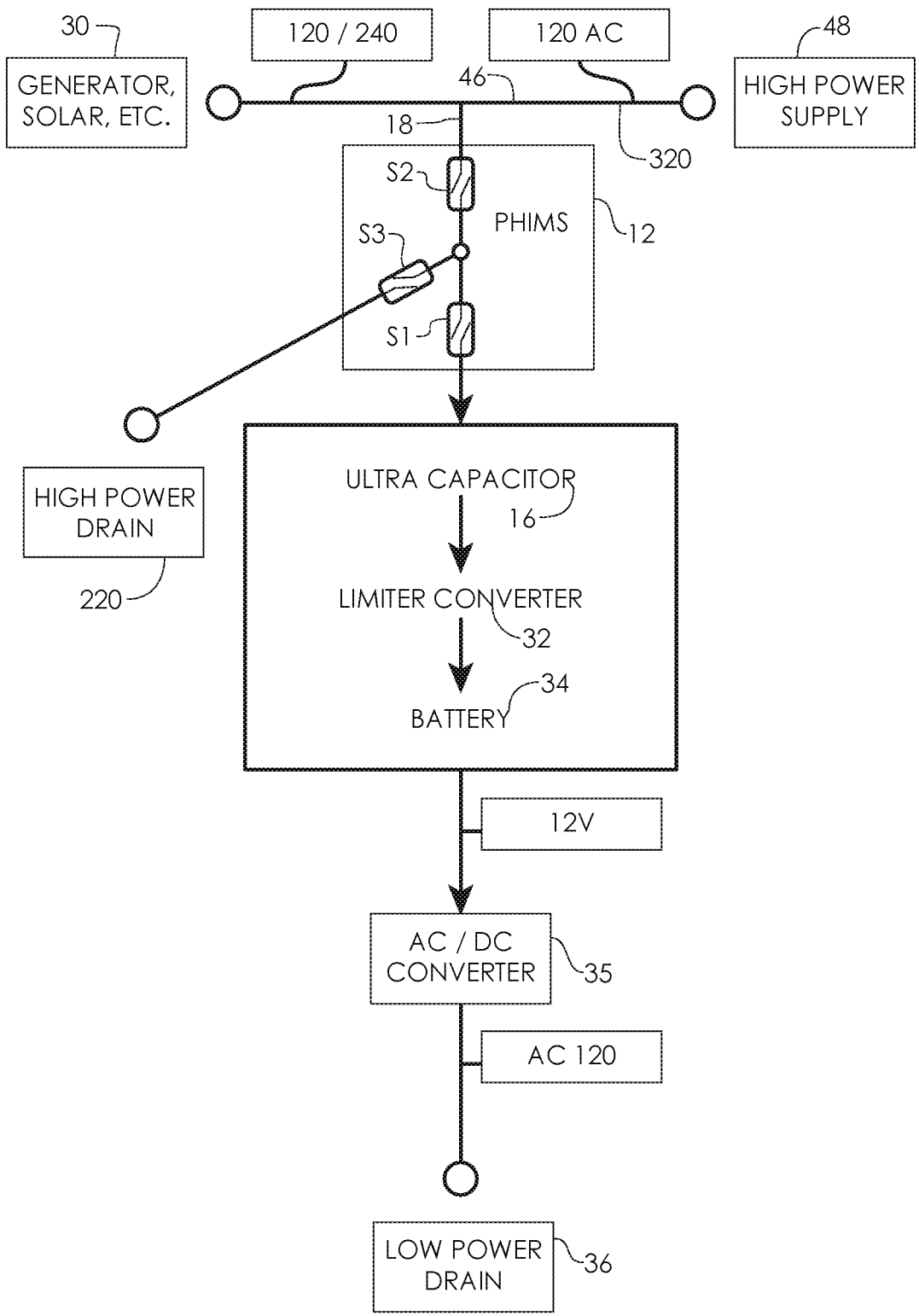
FIG. 7 shows an object diagram according to an embodiment of the present design showing a generic arrangement for any type of device having alternative energy sources, in this case for example generator (30) versus residential power supply (48).

Another possible use of alternative embodiments of the present design is depicted in FIG. 7. By capturing the lost heat from combustion in an LP engine (typically 70%), or other household energy source including alternators, green power generators, gasoline generators, and the like, the design can be used to monitor power in a home, a camper, a business, or otherwise produce energy. Transmission lines result in a great amount of waste of electricity during transmission, and furthermore, the transmission line system results in energy/heat loss (due to resistance) into the environment. With the PHIMS system, alternatives of the traditional design may deliver almost 90% of energy from combustion NG engine. See Tables 5 and 6 for data on generator use with small loads and with small/heavy loads respectively.

FIG. 7 shows an object diagram according to an embodiment of the present design showing a generic arrangement for any type of device having alternative energy sources, in this case for example generator (30) versus residential power supply (48). For uses with residential low power drain (36), the PHIMS (12) is attached to an ultra capacitor (16) which in turn is attached to a limiter converter (32) to a battery (34) to handle a low power drain load (36), such as LED lighting and the like. An AC/DC converter (35) may be required to provide 120 AC current for low power drain loads (36). The PHIMS is also attached to a power source (18) which may be a conventional generator, a green power source (solar, wind, water, or the like), a bank of batteries, a battery, and the like. The power source (18) may also alternatively be or include a high power supply (48) such as conventional power line provided power. The PHIMS (12) also is connected to the high power drain (220) to provide power from the generator (30), the high power supply (48), or for transient high power requirements, from the ultra capacitors (16). The ultra capacitors (16) are recharged via the power supply (18) and operate to maintain the charge in a load battery (34) which provides power to the low power drain load (36).

Figure 8:
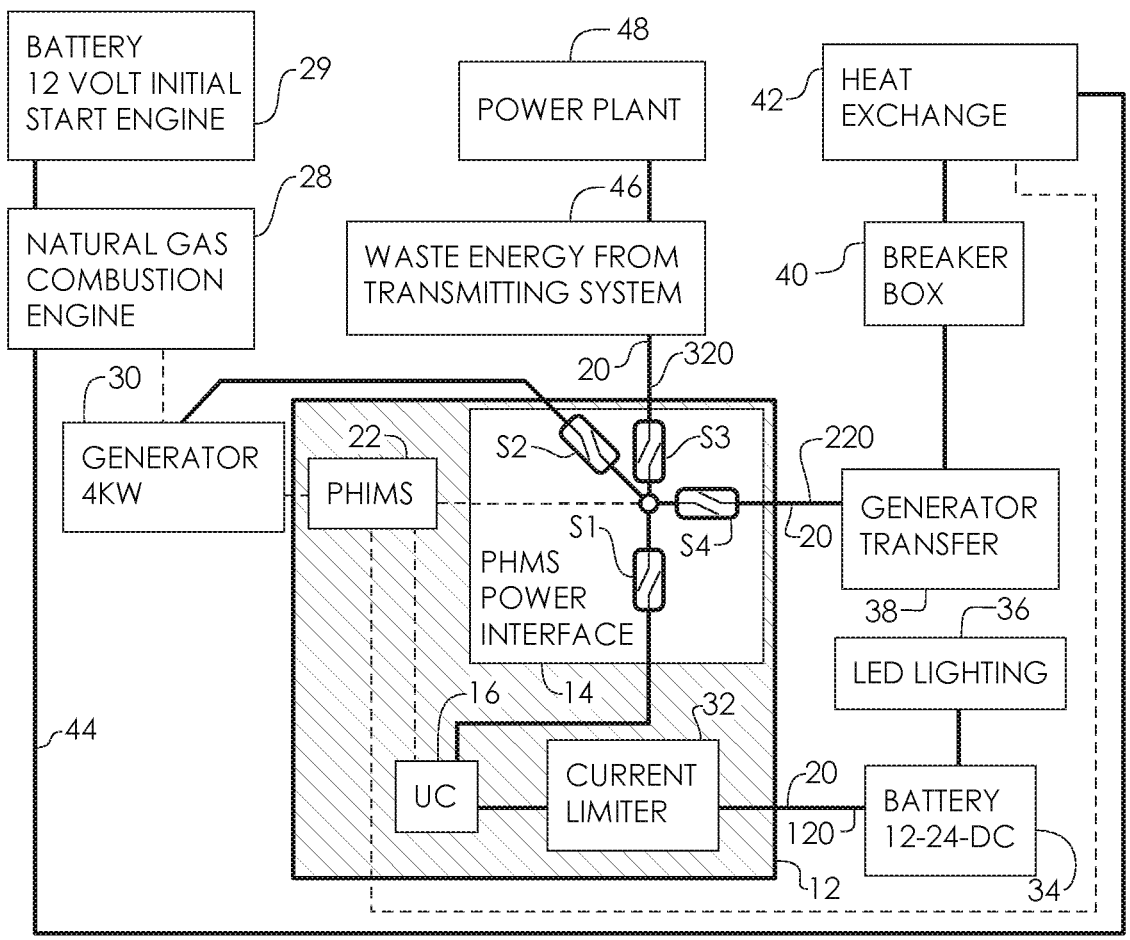
FIG. 8 shows an object diagram according to an embodiment of the present design for use in residential and commercial environments.

FIG. 8 is a more detailed example, which shows an object diagram for use in residential and commercial environments. Under this usage, the PHIMS (12) has a PHIMS controller 22, a PHIMS power interface (14), at least one ultra capacitor (16), but more likely a bank of a plurality of ultra capacitors (16). The PHIMS power interface (14) switches S1 for the ultra capacitor, S2 for the power source (18), and S3 and S4 for the load (20), as shown.

Figure 9:
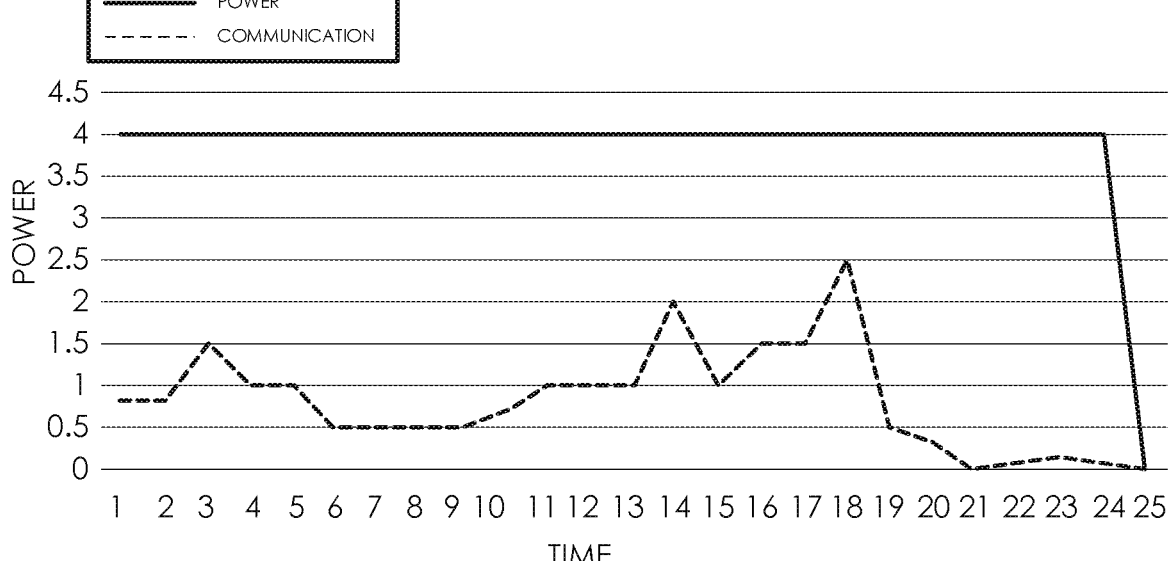
FIG. 9 shows a graph comparing projected power usage according to the present design to a conventional generator with Power (KW) versus Time (t).

FIG. 9 shows a graph comparing projected power usage according to the present design to a conventional generator with Power (KW) versus Time (t). A conventional generator (30) runs the entire time that the device is in use. A constant output of power is provided by a generator (30) until Examples of the present invention include providing power to an electric underground mining vehicle to extend the battery life thereof so that the battery may last for the entire time the miners are underground.

Another example is a toy car that can use two ultra capacitors for acceleration and a battery for constant velocity.

An example of a home application in which an emergency generator is used for a home. Conventional generators under such conditions run the entire time that they are powered on wasting most of the power generated. A low power load is typically required to power lights and the like. Excess power is charged back to the ultra capacitor during high power demands, and the ultra capacitor can then recharge the battery while the generated is turned off. An alternative high power soucrce such as natural gas, or other green energy source.

Yet another example is an off road ATV in which the internal combustion engine is supplemented during acceleration by a small bank of ultra capacitors. Table 2 describes an automotive example.

TABLE 1

Calculations for Automobile (See FIG. 5 Graph for MPH v. P)

|  |  | 1000 | MPH | P (kw) |
|---|---|---|---|---|
| P = Total power (kw) | P = (Fr + Fd)V + Ps | 2.75 | 5 | 0.33101139 |
| Fr = rolling friction force | Fr = Cr * m * g/1000 | 0.15 | 10 | 0.68371906 |
| g = gravity 9.81 = a |  | 9.810 | 15 | 1.07981929 |
| Ps = incline power kw | Ps = m * g * S * V/1000 | 0.000 | 20 | 1.54100836 |
| V = velocity m/s |  | 13.34945 | 25 | 2.08898255 |
| Fd = air drag force | Fd = ½Cd * A * U * V^2/1000 | 0.059 | 30 | 2.74543815 |
| Cr = co-eff rolling |  | 0.015 | 35 | 3.53207142 |
| U = air density |  | 1.200 | 40 | 4.47057866 |
| A = front area of car |  | 1.710 | 45 | 5.58265614 |
| Cd = co-eff air drag |  | 0.320 | 50 | 6.89000015 |
| m = weight kg |  | 1000 | 55 | 8.41430695 |
| S = slope % |  | 0.00% | 60 | 10.1772728 |
|  |  |  | 65 | 12.2005941 |
| mph |  | 30.00 | 70 | 14.505967 |
| Kilometer/Sec (k/s) |  | 13.35 | 75 | 17.1150878 |

TABLE 2

Scion Example

| XB Scion 2008 | Average MPH | MPG | HP | Need HP | Need Ratio |  | Potential |
|---|---|---|---|---|---|---|---|
| Gasoline | 32 | 30 | 160 | 20 | 20 | 8 | 240 |
| Diesel | 32 | 30 | 160 | 20 | 25 | 6.4 | 192 |
|  |  | 30 | 160 | 20 | 30 | 5.33333333 | 160 |
|  |  | 30 | 160 | 20 | 35 | 4.57142857 | 137.1428571 |
|  |  | 30 | 160 | 20 | 40 | 4 | 120 |
|  |  | 30 | 160 | 20 | 45 | 3.55555556 | 106.6666667 |
|  |  | 30 | 160 | 20 | 50 | 3.2 | 96 |
|  |  | 30 | 160 | 20 | 55 | 2.90909091 | 87.27272727 |
|  |  | 30 | 160 | 20 | 60 | 2.66666667 | 80 |

| XB Scion 2008 | Average MPH | MPG | HP | Need HP | Need Ratio |  | Potential mpg |
|---|---|---|---|---|---|---|---|
| Diesel | 32 | 50 | 160 | 20 | 20 | 8 | 400 |
| Diesel | 32 | 50 | 160 | 20 | 25 | 6.4 | 320 |
|  |  | 50 | 160 | 20 | 30 | 5.33333333 | 266.6666667 |
|  |  | 50 | 160 | 20 | 35 | 4.57142857 | 228.5714286 |
|  |  | 50 | 160 | 20 | 40 | 4 | 200 |
|  |  | 50 | 160 | 20 | 45 | 3.55555556 | 177.7777778 |
|  |  | 50 | 160 | 20 | 50 | 3.2 | 160 |
|  |  | 50 | 160 | 20 | 55 | 2.90909091 | 145.4545455 |
|  |  | 50 | 160 | 20 | 60 | 2.66666667 | 133.3333333 |

TABLE 3

Interstate highway driving

| Action Time second | Speed | Engine | Generator | Ultra-cap | Speed controller | Motor | Wheel |
|---|---|---|---|---|---|---|---|
| 0 | 0 | On | On | Charge | Off | Off | Off |
| 1 | 5 | On | On | Full Charge | On | On | On |
| 2 | 10 | On | On | Full | On | On | On |
| 3 | 25 | On | On | Discharge | On | On | On |
| 4 | 40 | On | On | Discharge | On | On | On |
| 5 | 60 | On | On | | On | On | On |
| 6 | 70 | On | On | Discharge | On | On | On |
| 6-100 | 70 | On | On | Discharge | On | On | On |
| Slow down 101-140 | 70-60 | Off | Off | Discharge | On | Off | On |
| 141-150 | 70 | Off | Off | Discharge | On | On | On |
| 151-160 | 70 | On | On | Off | On | On | On |
| Cruise Speed 161-171 | 70 | On | On | Charge excess power | On | On | On |
| 172-180 | 70 | On | On | Full/off | On | On | On |
| 181-1200 | 70 | On | On | Off | On | On | On |
| 1201-1300 | 70-40 | Off | Off | On | On-Brake | Off | On |
| 1301-1306 | 35 | Off | Off | On | On | Regenerate | On |
| 1307 | 10 | Off | Off | On | On | Regenerate | On |
| 1308 1360 Stop Light of traffic | 0 | Off | Off | On | On | Off | Off |
| 1361-1371 Move forward | 60 | Off | Off | Discharge | On | On | On |
| 1372-1390 | 70 | On | On | Discharge | On | On | On |
| 1391-1500 cruise | 70 | On | On | Charge excess power | On | On | On |
| 1500-1505 | 90 | On | On | Discharge | On | On | On |
| 1506-1800 | 70 | On | On | Charge excess power | On | On | On |

TABLE 4

City or Down town driving

| Action Time second | Speed | Engine | Generator | Ultra-cap | Speed controller | Motor | Wheel |
|---|---|---|---|---|---|---|---|
| 0 | 0 | On | On | Charge | off | Off | Off |
| 1 | 5 | On | On | Full Charge | On | On | On |
| 2 | 10 | On | On | Charge excess power | On | On | On |
| 3 | 25 | On | On | Off | On | On | On |
| 4-10 | 25 | On | On | Off | On | On | On |
| 11-25 | 25 | On | On | Off | On | On | On |
| 26-30 | 25-0 | Off | Off | On | On | On | On-off |
| 31-40 | 0-10 | Off | Off | Discharge | On | On | On |
| 41-45 | 10 | Off | Off | Discharge | On | On | On |
| 46-100 | 25 | On | On | Charge excess power | On | On | On |
| 101-200 | 25 | Off | Off | Discharge | On | On | On |
| 201-2101 | 25 | On | On | Charge excess power | On | On | On |

TABLE 4-continued

City or Down town driving

| Action Time second | Speed | Engine | Generator | Ultra-cap | Speed controller | Motor | Wheel |
|---|---|---|---|---|---|---|---|
| 2012-2100 | 25 | Off | Off | Discharge | On | On | On |
| 2110-2120 | 25 | On | On | Charge excess power | On | On | On |
| 2121-2221 | 25 | Off | Off | Discharge | On | On | On |

TABLE 5

Small Load Generator

| Time minute | Engine | Generator | Ultra-capacitor | Current Limiter | Battery | Small Load (LED Light) |
|---|---|---|---|---|---|---|
| 1-20 | On | On | Charge excess power-Full | On | Charge | On |
| 21-40 | Off | Off | Discharge | On | On | On |
| 41-50 | On | On | Charge | On | On | On |
| 51-100 bed time | On | On | Discharge | On | On | On very small load |

TABLE 6

Household Use with Heavy and Small Loads

| Time | Total Usage | Waste | PHIMS | Generator KW | Small Load | Heavy Load |
|---|---|---|---|---|---|---|
| 1 | 1.5 | 2.5 | 0.8 | 4 | 0.5 | 1 |
| 2 | 1 | 3 | 0.8 | 4 | 0.5 | 0.5 |
| 3 | 3.5 | 0.5 | 1.5 | 4 | 0.5 | 3 |
| 4 | 1.1 | 2.9 | 1 | 4 | 0.3 | 0.8 |
| 5 | 2.5 | 1.5 | 1 | 4 | 0.5 | 2 |
| 6 | 0.5 | 3.5 | 0.5 | 4 | 0.5 | 0 |
| 7 | 0.5 | 3.5 | 0.5 | 4 | 0.5 | 0 |
| 8 | 0.5 | 3.5 | 0.5 | 4 | 0.5 | 0 |
| 9 | 0.5 | 3.5 | 0.5 | 4 | 0.5 | 0 |
| 10 | 1.3 | 2.7 | 0.7 | 4 | 0.5 | 0.8 |
| 11 | 1.3 | 2.7 | 1 | 4 | 0.5 | 0.8 |
| 12 | 1.3 | 2.7 | 1 | 4 | 0.5 | 0.8 |
| 13 | 1.3 | 2.7 | 1 | 4 | 0.5 | 0.8 |
| 14 | 1.3 | 2.7 | 2 | 4 | 0.5 | 0.8 |
| 15 | 0.8 | 3.2 | 1 | 4 | 0.8 | 0 |
| 16 | 2.8 | 1.2 | 1.5 | 4 | 0.8 | 2 |
| 17 | 2.8 | 1.2 | 1.5 | 4 | 0.8 | 2 |
| 18 | 2.8 | 1.2 | 2.5 | 4 | 0.8 | 2 |
| 19 | 0.3 | 3.7 | 0.5 | 4 | 0.3 | 0 |
| 20 | 1.3 | 2.7 | 0.3 | 4 | 0.3 | 1 |
| 21 | 0.3 | 3.7 | 0 | 4 | 0.3 | 0 |
| 22 | 0.3 | 3.7 | 0.05 | 4 | 0.3 | 0 |
| 23 | 0.3 | 3.7 | 0.1 | 4 | 0.3 | 0 |
| 24 | 0.3 | 3.7 | 0.05 | 4 | 0.3 | 0 |
| | 30.1 | 65.9 | 20.3 | | | |

Electric Rate $0.1383 per kWh

| | Saving kWh | Saving$ |
|---|---|---|
| Per day | 7.908 | 1.093676 |
| Month | 237.24 | 32.81029 |
| Year | 2846.88 | 393.7235 |

Self-Power with natural gas 1 Million BTU = $17.00
Public power 293 kWh = 1 Million BTU = $44.00 at 0.1383 per kWh
Saving Ratio = 44/17    2.588235

It is to be understood that the present invention is not limited to the embodiments described above, but encompasses any and all embodiments within the scope of the following claims.

What is claimed is:

1. A power hybrid integrated management system (PHIMS) (12), comprising:
   a power interface (14) connected to an ultra capacitor (16), a power source (18) selected for a reduced capacity, and a load (20);
   the power interface (14) making a circuit connection between the load (20) and either the ultra capacitor (16) or the power source (18);
   a controller (22) for managing the power interface (14), and monitoring the ultra capacitor (16), power source (18), and demands of the load (20) attached thereto;
   wherein the power interface (12) selectively switches the circuit between either the ultra capacitor (16) or the power source (18), and between the load (20) in response to the level of demand of the load (20) attached thereto such that the ultra capacitor (16) solely powers peak demand and the power source (18) solely powers steady demand;
   wherein the capacity of the power source (18) is reduced from about ⅓ to less than about ⅓ of a standard power source (18) for the load (20).

2. The PHIMS of claim 1, wherein:
   the load (20) is an apparatus having a speed controller (22), a motor (24), and an axle (26);
   the power source (18) is an internal combustion engine (28) with a generator (30); or combinations thereof.

3. The PHIMS of claim 1, wherein:
   the load (20) is taken from the group consisting of a residential or commercial load (220) comprising at least one generator (transfer) (30) connected to at least one breaker box (40) to provide a high energy load (42) for residential or commercial energy requirements, a low energy load (120) having a load battery (34) connected to provide a low energy load (36) for low energy requirements, an excess energy load (320) which utilizes a waste energy recycle system (46) to provide excess energy generated to the power grid (48) for use by others on the power grid (48).

4. The PHIMS of claim 1, wherein:
   the power source (18) is a generator (30) attached to an internal combustion engine (28) which has a battery (29) to start the engine (28); and
   the size of the internal combustion engine (28) is reduced by ⅓ to less than ⅓ size of a standard internal combustion engine (28) required to power the load.

5. The PHIMS of claim 1, further comprising:
   a current limiter (32) connected to the ultra capacitor (16) connected to the load (20).

6. The PHIMS of claim 5, further comprising:
   a load battery (34) connected to the ultra capacitor (16) and a low energy load (36).

7. A power source (18) with a power hybrid integrated management system (12), comprising:
   an internal combustion engine (28) selected for a reduced size attached to a generator (30) connected to a power hybrid integrated management system (12) having a power interface (14) connected to an ultra capacitor (16), a power source (18), and a load (20);
   the power interface (14) making a circuit connection between the load (20) and either the ultra capacitor (16) or the power source (18);
   a controller (22) for managing the power interface (14), and monitoring the ultra capacitor (16), the power source (18), and demands of the load (20) attached to the power interface (14);
   wherein the power interface (12) is configured to selectively switch the circuit between either the ultra capacitor (16) or the power source (18), and between the load (20) in response to the level of demand of the load (20) attached thereto such that the ultra capacitor (16) solely powers peak demand and the power source (18) solely powers steady demand; and
   the size of the internal combustion engine (28) is reduced by ⅓ to less than ⅓ size of a standard internal combustion engine (28) required to power the load.

8. The source of claim 7, wherein:
   the load (20) is an apparatus having a speed controller (22), a motor (24), and an axle (26).

9. The source of claim 7, further comprising:
   a starter battery (29) to start the engine (28);
   an AC/DC converter to provide DC current to a low energy load (36); and
   a current limiter (32) to control the energy flow from ultra capacitor (16) to a load battery (34).

10. The source of claim 7, further comprising:
    a current limiter (32) connected to the ultra capacitor (16) connected to the load (20).

11. The source of claim 10, further comprising:
    a load battery (34) connected to the ultra capacitor (16) and a low energy load (36).

12. The source of claim 7, wherein:
    the load (20) is taken from the group consisting of a residential or commercial load (220) comprising at least one generator (transfer) (30) connected to at least one breaker box (40) to provide a high energy load (42) for residential or commercial energy requirements, a low energy load (120) having a load battery (34) connected to provide a low energy load (36) for low energy requirements, an excess energy load (320) which utilizes a waste energy recycle system (46) to provide excess energy generated to the power grid (48) for use by others on the power grid (48).

13. The source of claim 12, further comprising:
    a starter battery (29) to start the engine (28);
    an AC/DC converter to provide DC current to a low energy load (36); and
    a current limiter (32) to control the energy flow from ultra capacitor (16) to a load battery (34).

14. A control system for a power hybrid integrated management system (12), comprising:
    a controller (22) in communication with
    a power interface (14) connected to at least one ultra capacitor (16), at least one power source (18) selected for a reduced capacity, and at least one load (20);
    the power interface (14) configured to selectively switch between either the at least one ultra capacitor (16) or the at least one power source (18) to provide power to the at least one load (20) responsive to a level of power demand required by the load (20), and to recharge or maintain the charge in each ultra capacitor (16), such that the at least one ultra capacitor (16) solely powers peak demand and the at least one power source (18) solely powers steady demand;
    a power source (18);
    the at least one ultra capacitor (16) to monitor the charge thereof; and
    at least one load controller (22) configured to control the demands of the load (20);

wherein the capacity of the power source (18) is reduced from about ⅓ to less than about ⅓ of a standard power source (18) for the load (20).

15. The control system of claim 14, wherein:
the power source (18) is a battery (29), an internal combustion engine generator (30), or combinations thereof.

16. The control system of claim 14, further comprising:
at least one load controller (28) to actively monitor the power requirements of at least one power source (18).

17. The control system of claim 16, wherein:
the load (20) is taken from the group consisting of a motor (24), a battery (34), a generator transfer (38), a waste energy recycle system (46), or combinations thereof.

18. A method of operating a power hybrid integrated management system, comprising:
providing a power hybrid integrated management system, a power interface (14) connected to an ultra capacitor (16), a power source (18) selected for a reduced capacity, and a load (20);
the power interface (14) making a circuit connection between the load (20) and either the ultra capacitor (16) or the power source (18);
a controller (22) for managing the power interface (14), and monitoring the ultra capacitor (16), power source (18), and demands of the load (20) attached thereto;
wherein the power interface (12) selectively switches the circuit between either the ultra capacitor (16) or the power source (18), and between the load (20) in response to the level of demand of the load (20) attached thereto such that the ultra capacitor (16) solely powers peak demand unless depleted and the power source (18) solely powers steady demand;
wherein the capacity of the power source (18) is reduced from about ⅓ to less than about ⅓ of a standard power source (18) for the load (20); and wherein
the controller (22) is in communication with
the power interface (14) configured to selectively switch among at least one ultra capacitor (16) and at least one power source (18) to provide power to at least one load (20) responsive to a level of power demand required by the load (20), and to recharge or maintain the charge in each ultra capacitor (16);
a power source (18);
the at least one ultra capacitor (16) to monitor the charge thereof; and
at least one load controller (22) configured to control the demands of the load (20);
determining the level of power demand by monitoring the load demand;
switching the power interface (14) to ultra capacitor (16) under transient high power loads;
switching the power interface (14) to the power source (18) under low power or coasting power loads; and
switching the power interface (14) to recharge the ultra capacitor (16) with the power source (18).

19. The method of operating a power hybrid integrated management system (12) of claim 18, further comprising:
switching to recharge the ultra capacitor (16) with a load battery (34).

20. The method of operating a power hybrid integrated management system (12) of claim 18, further comprising:
switching to recharge a battery (34/29) with the ultra capacitor (16).

21. The method of operating a power hybrid integrated management system (12) of claim 18, further comprising:
switching to recapture the energy from breaking in an axel (26) driven device.

* * * * *